1,946,350

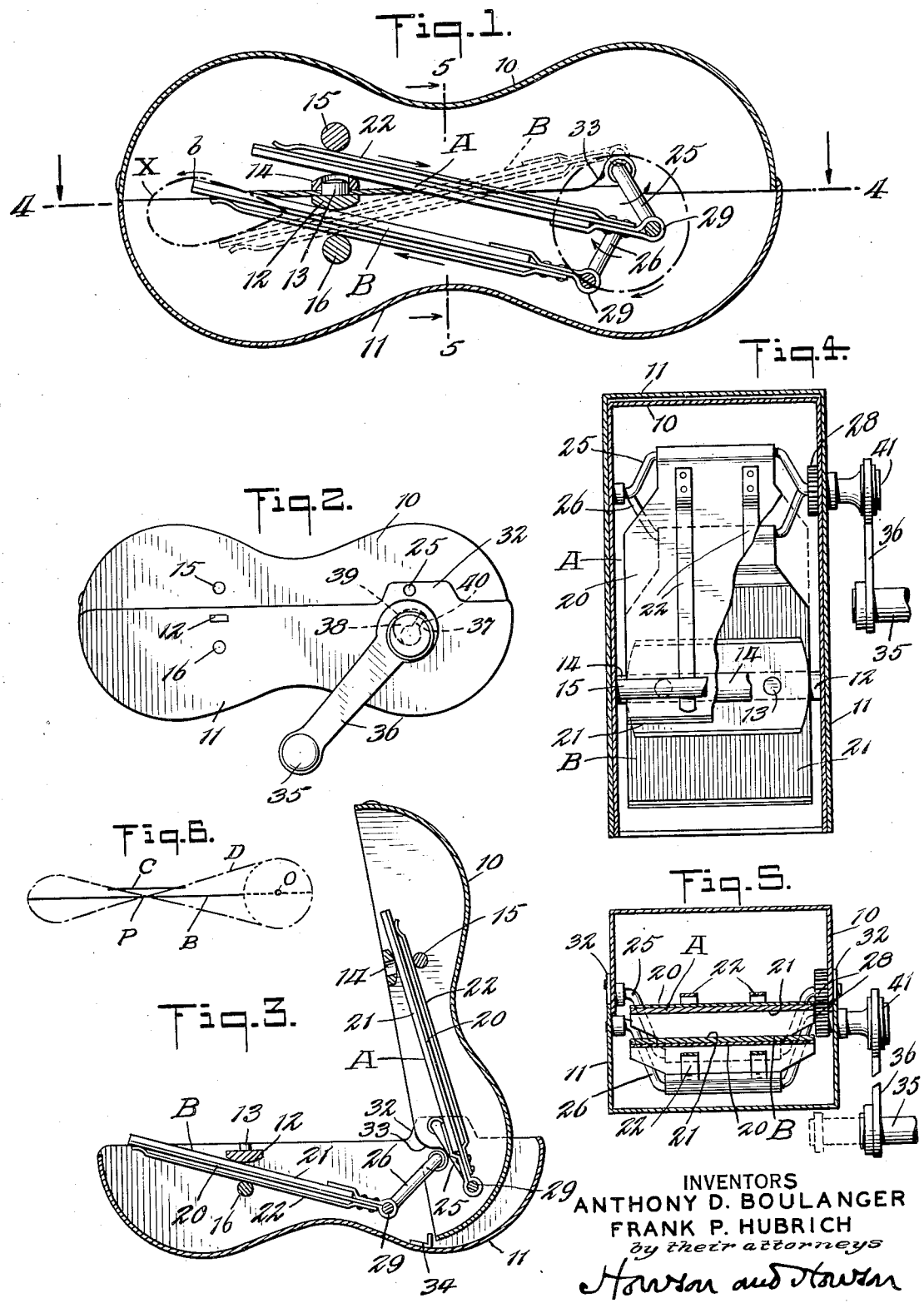
Feb. 6, 1934.     A. D. BOULANGER ET AL     1,946,350
BLADE STROPPER
Filed May 29, 1930
INVENTORS
ANTHONY D. BOULANGER
FRANK P. HUBRICH
by their attorneys Patented Feb. 6, 1934

UNITED STATES PATENT OFFICE 1,946,350

BLADE STROPPER

Anthony D. Boulanger and Frank P. Hubrich, Ridgefield Park, N. J., assignors, by direct and mesne assignments, to Edge-Bak Manufacturing Company, Inc., North Bergen, N. J., a corporation of New Jersey Application May 29, 1930. Serial No. 457,364

20 Claims. (Cl. 51—57)

This invention is in a razor blade stropper in which the strop is moved in relation to a fixed blade. Its main objects are to give a simple, compact device, easy in action, effective in its stropping and free from the likelihood of nicking or cutting the stropping surfaces.

The strop strokes the blade edge at an advantageous angle and before being reversed in direction it moves away from the edge, thus avoiding the nicking and cutting of the strop. Although the blade is held in a fixed position during stropping, a desirable flexure is possible under the stropping action as only one side of the edge is stroked at a time. A double edge blade may be stropped on both sides of both edges without being removed from the stropper or shifted in position. The stropper is compact and the casing is so shaped as to be held easily in one hand while the operating handle is being turned with the other hand. The operation of turning the handle requires an inappreciable effort as there is no uneven resistance to turning such as inheres in stroppers in which the blade is reversed on each stroke.

A preferred form of stropper, made in accordance with the invention and adapted to strop a Gillette blade, is shown in the accompanying drawing with reference to which the following description is given.

In the drawing:—

Figure 1 is a view in central vertical section through the stropper showing the strops in action and having in addition a diagram indicating the path of a point on the forward edge of one strop;

Figure 2 is a view, in elevation, of the stropper, the scale being reduced from that of Fig. 1;

Figure 3 is a view, in vertical section and to the scale of Figure 2, of the stropper opened to permit a blade to be set in place or to be removed;

Figure 4 is a plan view, in central horizontal section and drawn to the same scale as Figures 2 and 3;

Figure 5 is a view on the line 5—5 of Figure 1; and

Figure 6 is a diagram of the movement of a single strop.

The casing of the stropper is made up of two similar complementary sections 10, 11, one of which, spoken of here as the upper section 10, is hinged on the lower section 11 on an axis near one end so that the two may be swung apart to expose the interior. The arrangement, stated generally, is to have two strops, one in each casing section and a blade holder made up of two complementary parts, one in each section, so that the blade may be held in a fixed position between the sections when they are closed. When so held, the blade is in position to be stroked on opposite sides by the strops. The strops can act on either a single edge or a double edge blade and the characteristic of each is a movement in a figure eight path, both loops of which intersect the plane of the blade.

The blade holder consists of a bar 12 extending across the lower casing section 11 near its rim. On it are upstanding lugs 13 which may extend through the holes in a blade set on the bar. There is a second bar 14 that is similarly arranged across the upper casing section and has holes to receive these lugs and thereby it clamps the blade against the lower bar 13 when the casing is closed. Spaced above the upper bar 14 is a rod 15 secured in the upper casing section 10 and a similar rod 16 is secured in the lower section below the lower bar 12.

There are two strops, one (A) above the one (B) below the plane of the blade, each made up of a flat metal plate 20 with a piece of leather or other stropping material 21 fastened on its inner face. (See Figs. 1, 3 and 5.) On the other or outer face of each is a spring piece 22 free at one end. Thus, when put in between the guide rods 15, 16 respectively and the blade holder, with their stropping faces toward each other, the strops are pressed resiliently toward the plane of the blade and are thereby held from loose motion laterally between their guides and the blade holder, while being capable of sliding easily back and forth thereon. The spring pieces may be omitted however and reliance placed upon a good fit of the strop between its guides. The lower and upper faces respectively of the cross bars 12 and 14 are beveled to give the strops freedom for rocking and a smooth surface contact in all positions.

The strops are connected to oppositely rotating U-shaped cranks 25, 26 turning on axes on either side of the plane of the blade about in line respectively with points midway between the guide rods and the blade holder. The crank 25 for the upper strop swings within the lower crank (see Figs. 4 and 5) the spacing between them and the slope of their radial arms making this possible. The cranks are mounted in the casing sections, one in each, their ends extending through the side walls, and are turned by a handle extending outside the casing from the lower crank 26. The upper crank is geared to the lower by pinions 28 within the casing which cause the two to turn in opposite directions. A gear train to increase the speed of the strops over that of the handle can be used if desired. The hinge for the casing sections is provided by the ends of the upper crank 25 which extend not only through the upper casing section 10 but into upward wings 32 on the upper rim of the lower section 11. The rim of the upper section has slots 33 (Fig. 3) which permit it to swing without striking the lower crank 26 and to limit the swing of the casing parts there is a stop 34 on the bottom of the lower section.

A simple means of connecting the strop to its crank is afforded by doubling over one end of the strop-bearing plate 20 to form a loop 29 of a size to fit the crank. The metal doubled over can then serve to clamp the strop to the plate, rivets being used if desired to secure the bent over part to the main part of the plate.

The operating handle is of crank form, and the arm 35 that is grasped to turn it is slidable in the radius arm 36 to permit of packing the stropper in a smaller space. The radius arm 36 is connected to the axial extension of the lower crank 26 by any suitable one-direction drive mechanism. The one shown here (Fig. 2) is of a known sort. This mechanism consists of a radial pin 37 on the driven part, the axial extension of the crank 26, and an opening 38 in the driving member of a size to receive the pin, the opening having a spiral edge 39 beginning and ending at a radial face 40 at one side of the axis of the driven part. When in the position shown (Figure 2) the center line of the radius arm is offset from the center of the driven member in the direction of desired rotation and the turning effort establishes and maintains that relation. When the arm is turned in this desired direction (clockwise in Fig. 2) the radial face and the pin are held together so as to turn the driven part; when turned the other way, the off-set center of the radius arm swings into register with the axis of the driven crank and the spiral edge rides over the end of the pin, no turning force being exerted on the crank. The end of the radius member that has this opening is held on the driven arm and in place over the pin by flanges or discs 41 fixed on the driven part.

The casing is given a figure eight shape, made possible by the similar shape of the paths of the strops, though of course such a shape of the casing is not necessary. It has the advantage however that the depressions in the mid-portion make it easy to grasp the stropper in one hand while the handle is turned with the other. In thus holding the stropper in the natural way the blade holder bars are held together maintaining the blade securely in place.

When the handle is turned the two cranks turn in opposite directions and give the strops a motion that may be described as being on a figure eight path and may be understood by considering one strop. The motion is a combination of a reciprocation and a rocking about a midpoint in the stroke, that point being afforded by the guide rod and the blade holder bar between which the strop slides.

The dotted curve or loop X in Figure 1 represents the path of a point b at the forward edge of the lower strop B. As the crank 26 swings clockwise from the position shown, the point b is advanced in the direction of the left hand edge of the blade but is also moved downwardly because the rear end of the strop is being lifted and the guides at the midpoint cause the rocking which drops the forward edge. The point b does not begin to swing back until it and the rest of the strop are well below the plane of the blade. Such a movement makes it impossible for the strop to engage the blade when moving opposite to the direction of the blade edge.

By the time the crank 26 is in a vertical position, the strop is rocked to the dotted line position (Figure 1) and the point b is moving backward (i. e., to the right) and upward. On this part of the movement, the strop is stroking the other or right hand edge of the blade, going into engagement with it while moving in the direction of that edge and passing out of engagement with it before reversing as the crank 26 moves down from the top of its swing.

The figure eight curve D in Figure 6 is the outline of the area swept over by the stropping surface B in a full cycle in which it strokes alternately on one side the two edges of the blade C. The intersection P represents the point about which the strop rocks while reciprocating and the point O represents the axis of the crank from which the motion of the strop is derived. It is clear from this that the figure eight path with both loops intersecting the plane of the blade is characteristic of the motion with respect to a double edge blade. A similar double loop curve above the blade but likewise intersecting its plane would represent the path of the other strop. The pivot point P, it will be noted, is between the blade edges and at one side of the plane of the blade. In the case of a single edge blade it would be similarly spaced from the plane of the blade and in back of the edge. This movement of the strop caused by the crank and the pivot is substantially the equivalent of the movement of a member connecting two oppositely rotating cranks, one 180° ahead of the other, but the crank and pivot construction above described is to be preferred.

In this way the two edges of the blade are stroked alternately on one side by one strop and on the other side by the other strop which moves in a similar path. Of course if the blade has a single edge, the stroke in one direction is idle but the action with respect to the one edge stroked on the reverse movement is the same as with one edge of a double blade. The angular relation of the cranks is such that the strops are at all times in corresponding positions with respect to opposite edges, or in other words, whatever relation the upper strop bears at any instant to one edge, the lower strop is in the same relation to the opposite side of the other edge. It is a characteristic also that the strops move in substantial parallelism to each other, and that, while their reciprocations are in opposite directions at any instant, they rock in unison, that is to say, on one side of the pivots they go upward together and downward together on the other side, and then they reverse and rock together in the opposite direction when the reciprocations reverse. It is this lateral movement of the strop into and out of engagement with the blade while reciprocating back and forth past it that underlies the effectiveness of the stropping, the freedom from cutting and nicking and the ease of action.

It is possible to vary the details and the arrangement of the parts while still employing the broader underlying thoughts of the invention illustrated by the preferred form described. All such of these as come within the fair range of the following claims, we wish to include in the scope of protection afforded by a patent.

We claim—

1. A stropper comprising a blade-holder, a strop on one side of said holder, a guide for said strop fixed with respect to the blade holder and a crank for moving said strop on said guide along a loop path into stroking engagement with one edge of a blade in said holder and then curving out of engagement therewith before reversing in direction.

2. A stropper for a double edge blade comprising a blade holder, a strop on one side of the holder, a guide for said strop and a crank for moving the strop on said guide along a loop path intersecting the plane of the blade at said one edge of said blade and then in a reverse direction along a path similarly related to the other edge of said blade, the strop engaging said edges when moving outwardly of the blade.

3. A stropper comprising a blade holder, a pair of strops, one on each side of said holder, guides for said strops, crank arms offset with respect to each other, means connecting said crank arms and strops and means to rotate said cranks in opposite directions to shift said strops on said guides along curved paths intersecting the plane of the blade near an edge thereof to stroke the said edge alternately on opposite sides.

4. A stropper for a double edge blade comprising a blade holder, a pair of strops, one on each side of said holder, guides for said strops and cranks for moving said strops oppositely on said guides along like loop paths intersecting the plane of a double edged blade in said holder from opposite sides at one edge, and then along curved paths similarly related to the other edge, the strops engaging the two edges alternately and when moving in the direction thereof.

5. A stropper comprising a holder for a double-edge blade, a strop on one side of said holder, a guide for said strop and a crank for moving said strop on said guide in a figure eight path to stroke the two edges of a blade in said holder alternately on that side.

6. A stropper comprising a holder for a double-edge blade, a pair of strops, one on each side of said holder, guides for said strops and cranks for moving the strops oppositely on said guides in figure eight paths in which each strop strokes the two edges of a blade in said holder alternately on one side.

7. A stropper comprising a blade-holder and a pair of strops, one on each side of the holder guides for said strops and cranks for moving said strops in opposite directions on said guides in figure eight paths while maintaining them substantially parallel to each other.

8. A stropper comprising a blade-holder, a strop-bearing member, a crank for reciprocating said member longitudinally past said holder, and a guide about which said member pivots in its stroke, said guide being fixed with respect to the blade holder.

9. A stropper comprising a blade-holder, a strop-bearing member, a crank for reciprocating said member longitudinally and a guide fixed with respect to the blade holder on which said member pivots whereby the strop moves in a curved path on one side of a blade in said holder intersecting the plane of the blade near the blade edge.

10. A blade stropper comprising a blade-holder, guides on either side of said holder fixed with respect to the blade holder, strops extending respectively between said guides and said blade-holder and cranks for reciprocating said strops longitudinally while rocking them about said guides.

11. A stropper comprising a blade-holder, a pair of strops, one on each side of said holder, and cranks for reciprocating said strops oppositely while rocking them about points midway in their respective reciprocating strokes.

12. A stropper comprising a blade-holder and a pair of strops, one on each side of the holder, and mechanism for simultaneously reciprocating said strops in opposite directions and maintaining them in substantial parallelism while rocking them in the same directions to apply one strop to and remove the other strop from the one edge of a blade in said holder.

13. A stropper comprising a casing in two parts, a blade-holder comprising co-acting members, one extending across each casing part, a guide spaced from each of said members, together with a strop in each casing part between the guide and blade holder member and a crank connected to each strop, the two cranks being arranged to turn in opposite directions.

14. A stropper comprising a two-part casing, a strop mounted in each part of said casing, a blade-holder in said casing for holding a blade in fixed position between said strops and means for reciprocating said strops in opposite directions while rocking them in unison into and out of engagement with the opposite edges of a blade in said holder.

15. A blade stropper comprising a casing in two parts, complementary members in said parts forming a blade holder, a strop in each part and a crank for operating it, said cranks being geared together, the ends of one crank extending through the sides of both casing parts to provide a hinge for said parts, together with an operating handle for turning said cranks.

16. A blade stropper comprising a casing in two parts hinged together, a blade holder in said casing, a strop mounted in each part of said casing a crank for reciprocating each strop and guides about which said strops rock while reciprocating.

17. A stropper comprising a blade holder, a strop on one side of said holder, a guide for said strop fixed with respect to said blade holder and a crank arm moving said strop longitudinally with respect to said guide and about said guide as a pivot, said strop moving into stroking engagement with an edge of a blade in the holder and then moving out of engagement therewith during continued movement in one direction.

18. A stropper for a double edged blade comprising a blade holder, a strop on one side of said holder, a guide for said strop and a crank arm moving said strop longitudinally with respect to said guide and turning said strop about said guide, said strop following a loop path intersecting the plane of a blade in said holder at one edge thereof and then at the other edge and engaging said edges while moving outwardly of said blade.

19. A stropper comprising a blade holder, a strop on one side of said holder, a guide for said strop fixed with respect to said blade holder and a crank arm reciprocating said strop longitudinally with respect to said guide and about said guide as a pivot.

20. A stropper comprising a two-part casing, a strop mounted in each part of said casing, a blade holder in said casing for holding a blade in fixed position between said strops and means for reciprocating said strops in opposite directions while rocking them in unison to alternately engage an edge of a blade in said holder.

ANTHONY D. BOULANGER.
FRANK P. HUBRICH.